United States Patent [19]

Sullivan et al.

[11] Patent Number: 4,787,502

[45] Date of Patent: Nov. 29, 1988

[54] APPARATUS AND METHOD FOR CONVEYING MATERIAL

[75] Inventors: James F. Sullivan, Dallas; Jimmy D. White, Duncanville, both of Tex.

[73] Assignee: Triple/S Dynamics Inc., Dallas, Tex.

[21] Appl. No.: 892,429

[22] Filed: Aug. 4, 1986

[51] Int. Cl.[4] .................... B65G 27/00; B65G 27/22
[52] U.S. Cl. ................................. 198/771; 198/768
[58] Field of Search .................... 198/630, 768, 771

[56] References Cited

U.S. PATENT DOCUMENTS

| | | | |
|---|---|---|---|
| 3,087,602 | 4/1963 | Hinkle | 198/771 X |
| 3,195,713 | 7/1965 | Morris et al. | 198/771 X |
| 3,209,894 | 10/1965 | Baechli | 198/630 X |
| 3,327,832 | 6/1967 | Kyle | 198/630 |
| 3,693,740 | 9/1972 | Lewis et al. | 198/630 X |
| 3,848,541 | 11/1974 | Hondzinski | 198/630 X |
| 4,482,046 | 11/1984 | Kraus | 198/771 |

FOREIGN PATENT DOCUMENTS

| | | | |
|---|---|---|---|
| 1103851 | 3/1961 | Fed. Rep. of Germany | 198/630 |
| 763218 | 9/1980 | U.S.S.R. | 198/630 |
| 1032637 | 6/1966 | United Kingdom | 198/630 |
| 1183023 | 3/1970 | United Kingdom | 198/630 |

*Primary Examiner*—Randolph A. Reese
*Assistant Examiner*—John A. Ricci
*Attorney, Agent, or Firm*—Schwartz & Weinrieb

[57] ABSTRACT

A vibrating conveyor for moving agglutinous particulate materials that pack into large accumulations which adhere to its surface, eventually blocking the conveyor pan, is cleared of such accumulations by placing a flexible hose along its bottom. A flexible sheet lines the conveyor pan on top of the hose. The hose is inflated periodically so as to lift the sheet and thus break up the packed accumulations of material.

18 Claims, 1 Drawing Sheet

APPARATUS AND METHOD FOR CONVEYING MATERIAL

BACKGROUND OF THE INVENTION

This invention concerns the conveying of particulate materials and more precisely conveying materials that agglutinate. Foundry molding sand contains binders and agents that enable it to retain a desired shape after it has been removed from a mold. Transporting such sand on a conveyor can cause the sand to stick to the conveyor surface and to pack into large accumulations that block the conveyor, and such packing is especially severe on vibrating conveyors. Prior attempts to prevent or to break up such accumulations of packed sand by lining a conveyor with a flexible sheet material and flowing air under such sheet material have not been entirely successful. They have required the use of an excessive volume of air, which results in high capital and operating costs. Also, any holes or leaks in the sheet material renders the system ineffective for clearing packed material off the conveyor. And when the sheet material liner is sealed to the bottom of the conveyor at its sides, material packed against the upper sides or in the corners of the conveyor is not always dislodged.

OBJECTIVES OF THE INVENTION

Accordingly, it is an object of this invention to provide an improved method and apparatus for conveying particulate material.

Another object is to prevent accumulation of cohesive materials from blocking a conveyor.

Another object is to employ a hose to confine to a particular part of a conveyor the movements that break up packed material.

Another object is to lift a sheet of material out of the corners of a conveyor pan so as to remove packed material from such corners.

Another object is to provide efficient, adjustable, relatively low cost methods and apparatus for conveying agglutinating particulate materials by employing simple, mechanical devices that are easily controlled and maintained, and that do not have defects found in prior conveying procedures or equipment.

Other objects and advantages of the invention will be apparent from the specification and claims, and the scope of the invention will be set forth in the claims.

DESCRIPTION OF A PREFERRED EMBODIMENT

Figure 1:
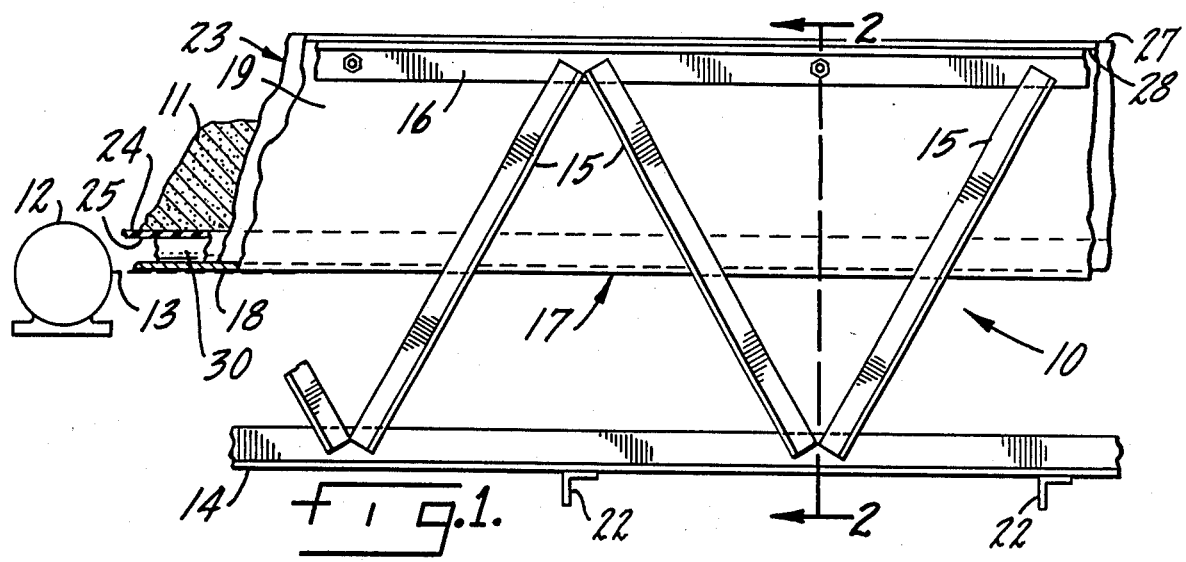
FIG. 1 is a fragmentary, partially broken-away, partially schematic elevational view of a conveyor in accord with this invention.

The drawing shows a conveyor 10, which may be supported in any conventional manner, for moving a particulate material 11, such as foundry mold sand, which tends to agglutinate. The conveyor may be powered by an electric motor 12 connected at 13 in any conventional manner to impart vibrating motion. For example, conveyor 10 may be a SLIPSTICK ® Differential Vibrating conveyor. A pair of parallel lower longitudinal frame members 14 are connected by struts 15 to a pair of parallel upper longitudinal frame member 16. An elongated vibrating conveyor pan or trough 17 has a flat bottom portion 18 and a pair of parallel upstanding side portions 19 and 20 that are substantially perpendicular to bottom portion 18 and that define corners 21. Trough 17 is secured to and supported by upper frame members 16. Spaced transverse connectors 22 join lower members 14. A continous elongated flexible sheet 23 having an upper surface 24 and a lower surface 25 lines trough 17 so that its lower surface is in contact with bottom portion 18. Sheet 23 is attached by bolts or other conventional means to trough 17 only along its upper terminal edges 27 adjacent the upper ends 28 of upstanding side portions 19 and 20. Sheet 23 may be made of three ply nitrile rubber belting material.

Figure 3:
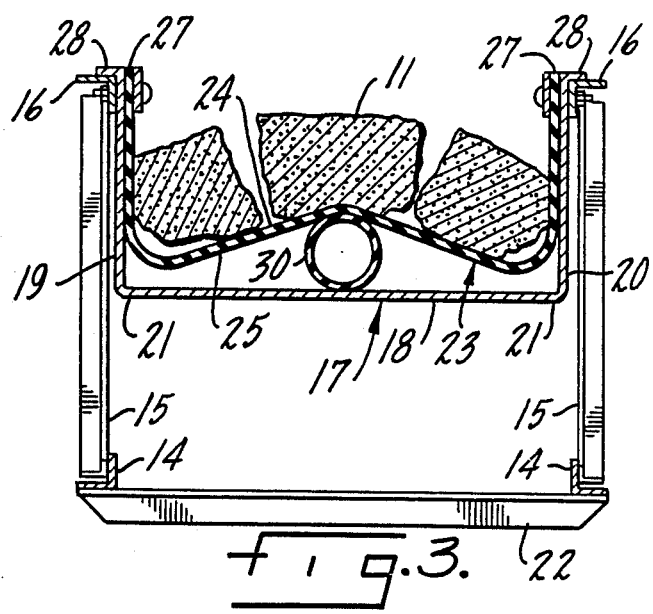
FIG. 3 is a cross sectional view corresponding to FIG. 2, but showing the tube inflated.

An elongated flexible hose 30 is inserted between the bottom 18 of trough 17 and the lower surface 25 of sheet 23. Hose 30 lies along the longitudinal center line of bottom 18, and its terminal end 31 is sealed. When hose 30 is fully inflated, as shown in FIG. 3, its diameter should be less than one third of the width of trough 17, and its diameter should be less than half the height of trough 17. For example, in a conveyor where trough 17 was two feet wide and one foot high, hose 30 had a diameter of four inches. Hose 30 may be made from two ply neoprene rubber contractor's suction hose.

Figure 2:
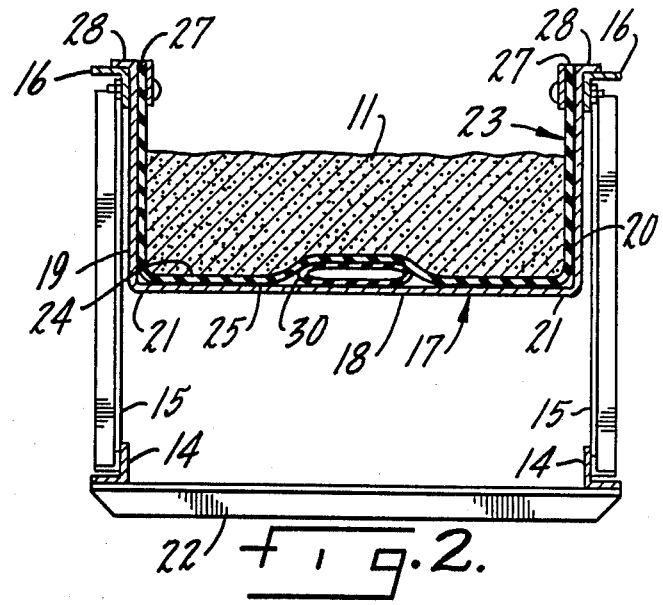
FIG. 2 is an enlarged cross sectional view taken along the line 2—2 in FIG. 1 showing the tube collapsed.

As shown in FIG. 2, hose 30 normally is collapsed by the weight of material 11 on upper surface 24. After conveyor 10 has been operating long enough to cause material 11 to pack into accumulations that interfere with its operation, a blast or pulse of air or other fluid should be sent into hose 30 so as to raise all or a part of sheet 23 off bottom portion 18 and out of corners 21. This will break material 11 into pieces that conveyor 10 can easily transport.

Figure 4:
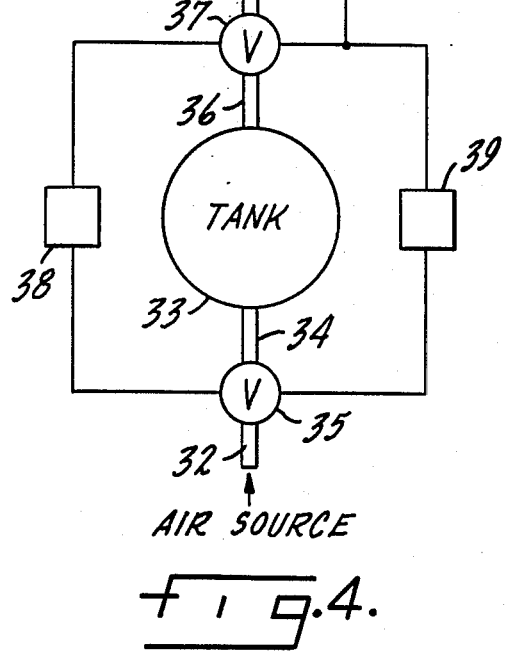
FIG. 4 is a schematic diagram of an air delivery system for this invention.

Air may be supplied to hose 30 in a series of timed pulses by the system diagrammed in FIG. 4. Compressed air from a source 32 is collected in a relatively small surge tank 33; in a conveyor system in accord with this invention using a hose four inches in diameter and sixty-six feet long, surge tank 33 only needed a capacity of about ten cubic feet. An inlet 34 connected to source 32 is controlled by inlet valve means 35. An outlet 36 is connected to hose 30, and flow out of tank 33 to hose 30 is controlled by outlet valve means 37. First or interval timer means 38 and second or pulse timer means 39 both control the opening and the closing of valve means 35 and 37. The first and second timer means are interconnected so that first means 38 starts second means 39. Second timer means 39 also controls the opening and the closing of an exhaust valve means 40 for air in hose 30. The pressure in tank 33 should be regulated so that it is in the range of about twenty to eighty p.s.i.

At first predetermined intervals governed by the composition of material 11 and the humidity or other operating conditions of conveyor 10, interval timer means 38 simultaneously opens outlet valve means 37 and closes inlet valve means 35, and also activates pulse timer means 39. This causes a strong pulse of air to rush into hose 30 which inflates the hose and lifts sheet 23 off bottom portion 18 and out of corners 21, thereby breaking up packed accumulations of material 11. The pressure in hose 30 may be kept in a predetermined narrow range or essentially at a predetermined value (e.g.

twenty p.s.i.) by nozzle means 41. For example, means 41 may be designed to operate in a predetermined critical flow range when the ratio of tank 33 pressure to hose 30 pressure is greater than about 1.9:1. Thus, if the initial tank pressure is forty p.s.i. at the instant valve means 37 opens, the pressure at the exit of nozzle means 41 will remain at twenty-one p.s.i. until equilibrium is reached at twenty p.s.i. This ensures that there is sufficient pressure in hose 30 to cause the pulse of air to move rapidly along its length, but prevents excessive pressure from damaging the hose or its connections. After a predetermined second interval governed by the operating conditions of conveyor 10, and less than the first intervals, timer means 39 simultaneously closes outlet valve means 37 and opens inlet valve means 35 and exhaust valve means 40. This allows the air to escape rapidly from hose 30 and restores the pressure in tank 33. The rate of expansion of hose 30 can be adjusted by changing the pressure in tank 33 and adjusting nozzle means 41, and first and second timer means 38 and 39 can be adjusted to vary the frequency or duration of the cycles when hose 30 is inflated.

It has thus been shown that by the practice of this invention packaged agglutinous material on a vibrating conveyor can be broken up by inflating a single hose 30 at the center of the bottom of the conveyor. Liner sheet 23 need not be attached to bottom portion 18 or at corners 21 and is thus free for movement off the bottom and out of the corners. Hose 30, or additional hoses, may be placed at other locations in trough 17 if operating conditions change, and the interval and duration of the air pulses may be changed as required.

While the present invention has been described with reference to particular embodiments, it is not intended to illustrate or describe herein all of the equivalent forms or ramifications there. Also, the words used are words of description rather than limitations, and various changes may be made without departing from the spirit or scope of the invention disclosed herein. It is intended that the appended claims cover all such changes as fall within the true spirit and scope of this invention.

What is claimed is:

1. A conveyor for moving particulate agglutinating material comprising: a trough having a bottom portion and upstanding side portions, a flexible sheet having an upper surface and a lower surface lining said trough with its lower surface in contact with said bottom portion, said sheet being attached to said trough adjacent the upper edges of said upstanding side portions; means for moving said conveyor so as to cause said particulate material to flow through said trough over said upper surface of said sheet; and means for breaking up accumulations of said particulate material in said conveyor comprising a flexible hose lying on said bottom portion in contact with said lower surface of said sheet, said hose normally being collapsed by the weight of particulate material on said upper surface of said sheet; and means for inflating said hose with a fluid so that said hose assumes a substantially round cross section and raises said sheet off said bottom portion and away from at least a portion of said upstanding side portions of said trough to break up packed accumulations of said particulate material.

2. The invention as defined in claim 1 wherein one end of said hose is sealed.

3. The invention as defined in claim 1 wherein when said hose is inflated, its diameter is less than the width of said trough.

4. The invention as defined in claim 3 wherein said diameter of said hose is less than one-third of the width of said trough.

5. The invention as defined in claim 1 wherein when said hose is inflated, its diameter is less than the height of said trough.

6. The invention as defined in claim 5 wherein said diameter of said hose is less than half the height of said trough.

7. The invention as defined in claim 1 wherein said side portions are substantially perpendicular to said bottom portion.

8. The invention as defined in claim 1 wherein said hose lies along the center of said bottom portion.

9. The invention as defined in claim 1 further comprising means for sending intermittant, timed pulses of fluid into said hose.

10. The invention as defined in claim 9 wherein said means for sending fluid comprises a surge tank having an inlet connected to a pressurized source of air and an outlet connected to said hose, inlet valve means controlling flow of air into said surge tank, outlet valve means controlling flow of air out of said surge tank to said hose; first timer means controlling the opening and the closing of said inlet and outlet valve means; second timer means connected to said inlet and outlet valve means and to an exhaust valve means for air in said hose; said first timer means at predetermined first intervals simultaneously closing said inlet valve means, opening said outlet valve means, and starting said second timer means; said second timer means after a second predetermined interval shorter than said first interval simultaneously closing said outlet valve means and opening said exhaust valve means and said inlet valve means; whereby timed pulses of air are injected into said hose.

11. The invention as defined in claim 10 further comprising means for maintaining the air pressure in said hose during said pulses within a predetermined range.

12. A conveyor for moving particulate agglutinating material comprising: an elongated trough having a bottom portion and upstanding opposed side portions substantially perpendicular to said bottom portion, an elongated flexible sheet having an upper surface and a lower surface lining said trough with its lower surface in contact with said bottom portion, said sheet being attached to said trough along only the upper edges of said upstanding side portions; means for moving said conveyor so as to cause said particulate material to flow through said trough over said upper surface of said sheet; and means for breaking up accumulations of said particulate material in said conveyor comprising an elongated flexible hose having one end sealed and lying on said bottom portion adjacent its center in contact with said lower surface of said sheet, said hose normally being collapsed by the weight of particulate material on said upper surface of said sheet, means for inflating said hose with a gas so that said hose assumes a substantially round cross section and raises said sheet off said bottom portion and away from at least a portion of said upstanding side portions of said trough and thereby to break up packed accumulations of said particulate material; and when said hose is inflated, its diameter being less than one-third of the width of said trough, and less than half the height of said trough.

13. The invention as defined in claim 12 further comprising means for sending intermittent, timed pulses of air into said hose comprising a surge tank having an inlet connected to a pressurized source of air and an outlet connected to said hose, inlet valve means controlling flow of air into said surge tank, outlet valve means controlling flow of air out of said surge tank to said hose; first timer means controlling the opening and the closing of said inlet and outlet valve means; second timer means also controlling said inlet and outlet valve means and also an exhaust valve means for air in said hose; said first timer means at predetermined first intervals simultaneously closing said inlet valve means, opening said outlet valve means, and starting said second timer means; said second timer means after a second predetermined interval shorter than said first interval simultaneously closing said outlet valve means and opening said exhaust valve means and said inlet valve means; whereby timed pulses of air are injected into said hose.

14. The invention as defined in claim 13 further comprising means for maintaining the air pressure in said hose within a predetermined range.

15. The method of preventing the packing of an agglutinating particulate material which is being moved along a vibrating conveyor that has a bottom portion and opposed upstanding side portions, comprising the steps of:
   (A) lining said conveyor with a sheet of flexible material with the under surface of said sheet being in contact with said bottom portion;
   (B) attaching said sheet adjacent to the upper edges of said upstanding portions;
   (C) placing a hose between said bottom portion and said under surface of said sheet;
   (D) collapsing said hose by placing said particulate material on the upper surface of said sheet;
   (E) causing said conveyor to vibrate and thereby to move said particulate material; and
   (F) moving said sheet away from said bottom portion and at least a part of said side portions so as to break up packed accumulations of said particulate material on said upper surface by periodically inflating said hose.

16. The invention as defined in claim 15 further comprising attaching said sheet only along said upper edges of said upstanding side portions.

17. The invention as defined in claim 16 wherein said upstanding side portions define corners where they meet said bottom portion, and said hose is located so as to lift said sheet out of said corner.

18. The invention as defined in claim 15 further comprising sealing one end of said hose.

* * * * *